United States Patent
Frestel et al.

(10) Patent No.: US 10,249,267 B2
(45) Date of Patent: Apr. 2, 2019

(54) METHOD FOR GRAPHICALLY REPRESENTING A SYNTHETIC THREE-DIMENSIONAL VIEW OF THE EXTERIOR LANDSCAPE IN AN ON-BOARD VISUALISATION SYSTEM FOR AIRCRAFT

(71) Applicant: THALES, Courbevoie (FR)

(72) Inventors: Norbert Frestel, Saint Medard en Jalles (FR); Emmanuel Monvoisin, Bordeaux (FR); Pierre Mariani, Saint Medard en Jalles (FR); Johanna Lux, Le Haillan (FR)

(73) Assignee: THALES, Courbevoie (FR)

( * ) Notice: Subject to any disclaimer, the term of this patent is extended or adjusted under 35 U.S.C. 154(b) by 121 days.

(21) Appl. No.: 15/394,778

(22) Filed: Dec. 29, 2016

(65) Prior Publication Data

US 2017/0186406 A1 Jun. 29, 2017

(30) Foreign Application Priority Data

Dec. 29, 2015 (FR) .................................. 15 02719

(51) Int. Cl.
*G02B 27/01* (2006.01)
*G09G 5/38* (2006.01)
(Continued)

(52) U.S. Cl.
CPC .............. *G09G 5/38* (2013.01); *G01C 23/00* (2013.01); *G02B 27/01* (2013.01); *G06T 15/00* (2013.01);
(Continued)

(58) Field of Classification Search
CPC ...... G08G 5/0021; G08G 5/025; B64D 43/00; B64D 45/08; G06T 15/00; G06T 15/20;
(Continued)

(56) References Cited

U.S. PATENT DOCUMENTS 6,233,522 B1 * 5/2001 Morici ................. G01C 21/005
342/64
8,755,954 B1 * 6/2014 McCusker ............. G01S 13/94
340/970

(Continued)

FOREIGN PATENT DOCUMENTS

EP 2 221 583 A2 8/2010
EP 2 613 125 A2 7/2013
EP 2 717 228 A1 4/2014

OTHER PUBLICATIONS

French Search Report for corresponding French Patent Application No. 1502719, 8 pp., (dated Nov. 2, 2016).
(Continued)

*Primary Examiner* — Mark K Zimmerman
*Assistant Examiner* — Phuc N Doan
(74) *Attorney, Agent, or Firm* — Womble Bond Dickinson (US)

(57) ABSTRACT

The general field of the invention is that of the graphical representation of a synthetic three-dimensional view of the exterior landscape in an on-board visualization system for aircraft, said graphical representation being displayed on a visualization screen comprising the piloting and navigation information of said aircraft superposed onto said three-dimensional synthetic representation of the exterior landscape, said synthetic representation being computed up to a first determined distance, characterized in that said three-dimensional synthetic representation is tilted at a tilt angle about an axis positioned at the level of the terrain in a substantially horizontal plane, and substantially perpendicularly to an axis between the flight direction and the heading of the aircraft, said axis moving with the aircraft.

10 Claims, 6 Drawing Sheets

(51) Int. Cl.
*G06T 15/00* (2011.01)
*G06T 19/00* (2011.01)
*G01C 23/00* (2006.01)

(52) U.S. Cl.
CPC ...... *G06T 19/006* (2013.01); *G02B 2027/014* (2013.01); *G02B 2027/0183* (2013.01); *G09G 2340/0464* (2013.01); *G09G 2380/12* (2013.01)

(58) Field of Classification Search
CPC ....... G06T 15/50; G06T 19/006; G06T 19/20; G06T 2200/04; G06T 2215/16; G06T 2219/2016; G06T 2219/2204; G01C 23/00; G02B 2027/0183; G02B 2027/014; G02B 27/0101; G09G 2340/0464; G09G 2380/12; G09G 5/38
See application file for complete search history.

(56) References Cited

U.S. PATENT DOCUMENTS

| | | | | |
|---|---|---|---|---|
| 2002/0080145 A1* | 6/2002 | Ishihara | ................ | G01C 5/005 345/589 |
| 2002/0113719 A1* | 8/2002 | Muller | ................ | G08G 5/0086 340/961 |
| 2002/0145543 A1* | 10/2002 | Hausmann | ............. | G01C 23/00 340/975 |
| 2004/0264761 A1* | 12/2004 | Mas | ................... | G06K 9/00664 382/154 |
| 2010/0250030 A1* | 9/2010 | Nichols | ................ | G01C 23/005 701/7 |
| 2012/0069019 A1* | 3/2012 | Richards | ................ | G06T 7/536 345/421 |
| 2014/0354456 A1* | 12/2014 | Gannon | .............. | G08G 5/0047 340/972 |

OTHER PUBLICATIONS

Honeywell, "Vision Systems Overview—EVS FFVS SVS CVS— C&PS Flight Technical Services", retrieved from the Internet: https://www.mygdc.com/assets/public_files/gdc_services/pilot_services/presentations/Vision_Systems_Overview.pdf, 25 pp., (Jan. 2013).

U.S. Department of Transportation Federal Aviation Administration, "Airworthiness Approval of Enhanced Vision System, Synthetic Vision System, Combined Vision System, and Enhanced Flight Vision System Equipment", AC No. 20-167, retrieved from the Internet: https://www.faa.gov/documentLibrary/media/Advisory_Circular/AC%2020-167.pdf, 77 pp., (Jun. 22, 2010).

* cited by examiner

METHOD FOR GRAPHICALLY REPRESENTING A SYNTHETIC THREE-DIMENSIONAL VIEW OF THE EXTERIOR LANDSCAPE IN AN ON-BOARD VISUALISATION SYSTEM FOR AIRCRAFT

FIELD

The field of the invention is that of human-machine interfaces for aeronautical applications, and more particularly that of synthetic visualisation systems comprising means for displaying synthetic three-dimensional image of the exterior landscape.

BACKGROUND

Modern aircraft generally possess synthetic vision system (SVS). This system allows the crew to be presented with synthetic image of the exterior landscape generally comprising piloting or navigation information.

An SVS system comprises a cartographic database representing the overflown terrain, a geolocation system, electronic computing means and one or more visualisation devices embedded in the cockpit of the aircraft. The geolocation system is of GPS (global positioning system) type. It may be coupled to the inertial system of the aircraft. The overall global positioning system delivers at least the following parameters: the position of the aircraft in terms of latitude, longitude and altitude, and the orientation of the aircraft in terms of pitch, roll and heading.

Generally, the images displayed on the viewing screens which are located on the front of the instrument panel of the aircraft. The image is a three-dimensional view of the exterior shown so as to be as realistic as possible. The point of view displayed is that along the axis of the aircraft. The synthetic image is computed up to a certain distance away from the aircraft so as to limit the computations required for the display. This distance is referred to as the SVS range. Its order of magnitude is 40 nautical miles. Specifically, beyond a certain distance, the dimensions of the image of the landscape are small. Furthermore, it is of no more than minor interest to the pilot of the aircraft.

This synthetic image generally comprises a piloting and navigation assistance symbology. It conventionally comprises an artificial horizon giving the altitude of the aircraft and indicators giving the altitude and the speed of the aircraft. This symbology also displays a line representing the zero longitudinal altitude indicator, also referred to as the ZPRL (zero pitch reference line). The ZPRL is often, although incorrectly, referred to as the "horizon line".

Figure 1:
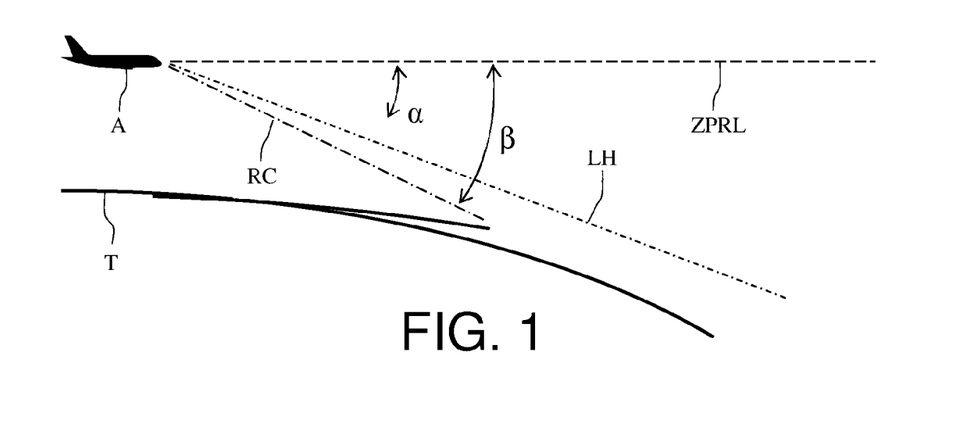
FIG. 1 represents a vertical cross-sectional view of an aircraft overflying a terrain.

As shown in FIG. 1, which represents a vertical cross-sectional view of an aircraft A flying over a terrain T, the ZPRL forms a first angle α with the true horizon line LH. This line forms a second angle β with the limit of the cartographic representation RC which is necessarily greater than the first angle. These angles are generally of several degrees.

Figure 2:
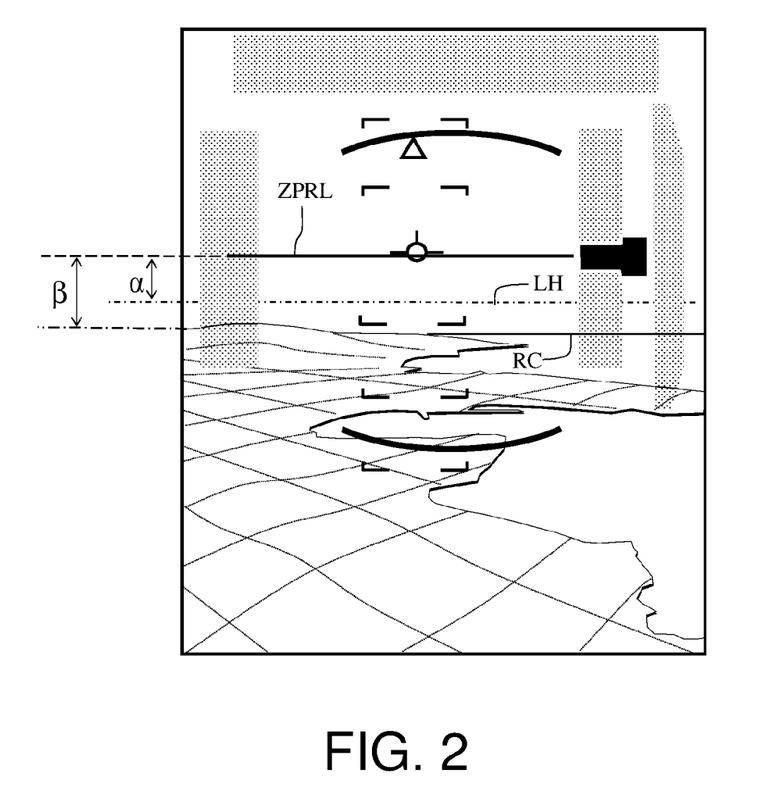
FIG. 2 represents the display, on an aircraft visualisation device, of a cartographic representation of the overflown terrain comprising a piloting symbology according to the prior art.

FIG. 2 shows the display, on an aircraft visualisation device, of a cartographic representation of the overflown terrain comprising a piloting symbology. This symbology comprises a ZPRL. In this figure, the difference between this ZPRL and the end of the cartographic representation is notable. It has been demonstrated that a significant angular deviation between the SVS and the ZPRL is very confusing for pilots since it does not correspond to the usual visual orders of magnitude. This occurs above all at high altitude, the deviation increasing with the altitude of the aircraft.

Furthermore, certain aeronautical standards such as the AC20-167 standard entitled "Airworthiness Approval of Enhanced Vision System, Synthetic Vision System, Combined Vision System, and Enhanced Flight Vision System Equipment" mandate that the information provided by the SVS is correlated to the ZPRL. For example, the terrain which is located above the altitude of the carrier at a given instant in time must always appear above the ZPRL, if it is close enough to be dangerous.

One means of solving these various problems is to display a cartographic representation over longer distances. The drawback of this solution is a substantial additional need in terms of the performance of the electronic platform, both the central processor and the graphical computing means, in order to allow the image to be displayed at the expected frequency and image quality.

SUMMARY

The cartographic representation method according to the invention does not have these drawbacks. Conventionally, the cartographic representation is shown in a conformal position, i.e. it is perfectly superposed onto the terrain that it represents, allowing for any positioning uncertainties. In the visualisation system according to the invention, the cartographic representation is tilted so as to artificially approach the limit of the cartographic representation of the true horizon. More specifically, a subject of the invention is a method for graphically representing a synthetic three-dimensional view of the exterior landscape in an on-board visualisation system for aircraft, said graphical representation being displayed on a visualisation screen comprising the piloting and navigation information of said aircraft superposed onto said three-dimensional synthetic representation of the exterior landscape, said synthetic representation being computed up to a first determined distance, characterised in that said three-dimensional synthetic representation is tilted at a tilt angle about an axis positioned at the level of the terrain in a substantially horizontal plane, and substantially perpendicularly to an axis between the flight direction and the heading of the aircraft, said axis moving with the aircraft.

Advantageously, the axis is positioned substantially vertically with respect to the aircraft.

Advantageously, the axis is positioned in front of the aircraft, at a second distance of between a few tens of nautical miles and 40 nautical miles.

Advantageously, below a determined difference in altitude between the aircraft and the overflown terrain, the tilt angle is zero.

Advantageously, the value of the determined difference in altitude between the aircraft and the overflown terrain is 7500 feet.

Advantageously, above a determined difference in altitude between the aircraft and the overflown terrain, the tilt angle increases with altitude.

Advantageously, the tilt angle is determined so that the angular difference between the limit of the three-dimensional representation of the exterior landscape computed up to the first determined distance and a line representing the true horizon is less than one degree.

Advantageously, the visualisation device comprises a real image of the exterior landscape superposed onto the synthetic view of the exterior landscape.

Advantageously, the visualisation device is one of the screens of the instrument panel of the aircraft.

Advantageously, the visualisation device is a visualisation device referred to as a "heads-up" visualisation device comprising an optical element superposing the synthetic image and/or the real image onto the exterior landscape.

BRIEF DESCRIPTION OF THE DRAWINGS

The invention will be better understood and other advantages will become apparent upon reading the description which will follow, given by way of non-limiting example and by virtue of the appended figures among which.

DETAILED DESCRIPTION

The method according to the invention is implemented in the synthetic visualisation system or SVS embedded on an aircraft. This comprises at least one cartographic database, geolocation means, electronic means allowing a representation of the main parameters of the aircraft to be computed, a graphical computer and at least one visualisation device. The geolocation means are, by way of example, of GPS (global positioning system) type, which may or may not be coupled/hybridised with an inertial measurement unit.

The display on the screen of the visualisation device represents a three-dimensional synthetic view of the overflown terrain. This synthetic representation is computed up to a first determine distance, referred to as the SVS range. This view comprises a piloting and navigation assistance symbology. It conventionally comprises an artificial horizon giving the altitude of the aircraft and indicators giving the altitude and the speed of the aircraft. It also comprises a line representing zero longitudinal altitude indicator, also referred to as the ZPRL.

The screens may also display, instead of the SVS, a real image of the exterior landscape, arising from a system referred to as the EVS (enhanced vision system), or displayed as real image in superposition on the synthetic view of the exterior landscape; CVS (combined vision system) will then be spoken of.

The visualisation device may also be visualisation device referred to as a heads-up visualisation device comprising an optical element superposing the synthetic image and/or the real image onto the exterior landscape.

In the method for graphically representing the terrain according to the invention, the three-dimensional synthetic representation is tilted at a tilt angle $\theta$ about an axis X positioned at the level of the terrain in a substantially horizontal plane, and substantially perpendicularly to an axis between the flight direction and heading of the aircraft said axis moving with the aircraft. This axis is symbolically represented by a circled cross in the various figures.

Figure 3:
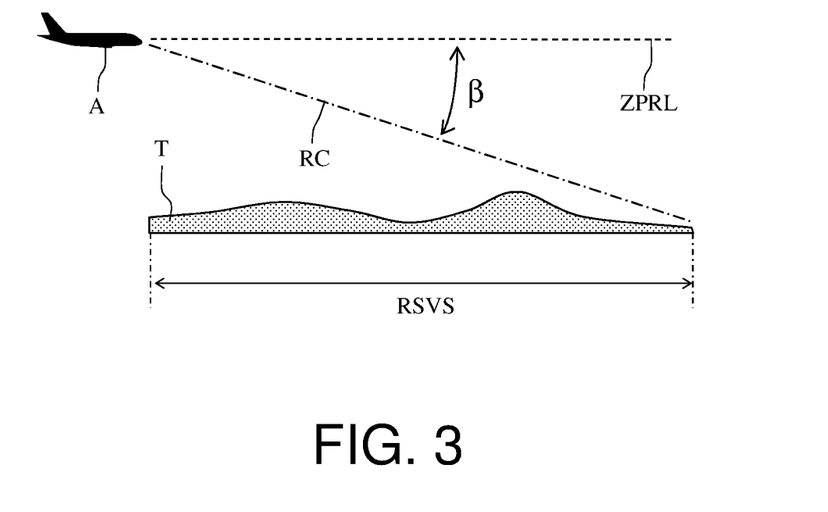
FIGS. 3 and 4 represent the principle of tilting the cartographic representation implemented in the method according to the invention.
Figure 4:
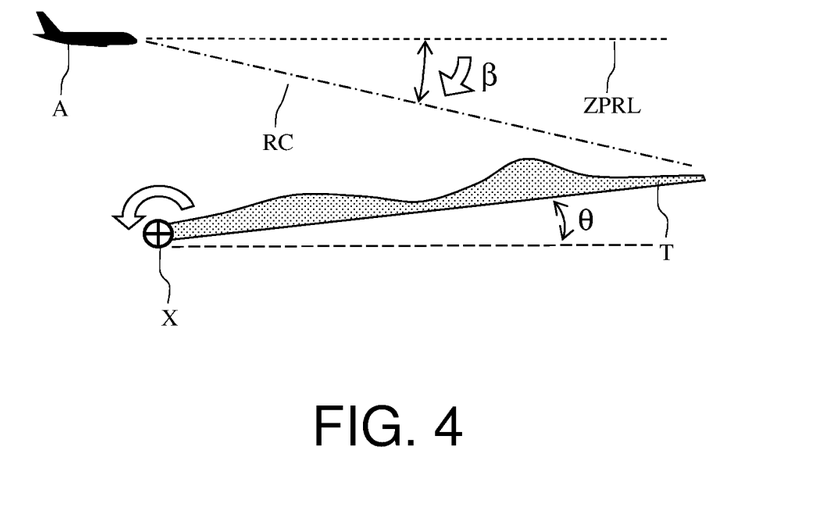

This talk function is illustrated in FIGS. 3 and 4 which show, in a vertical cross-sectional plane, the representation of the terrain T overflown by an aircraft A before and after tilting. The SVS range is denoted by RSVS in these and the following figures. In these figures, the limit of the cartographic representation RC and ZPRL, representing the zero longitudinal altitude indicator, are also shown.

As shown in FIG. 4, this rotation of the representation of the terrain makes it possible to decrease the angle between the ZPRL and the SVS range line. It is thus possible for it to approach, or even merge with, the true horizon.

Figure 5:
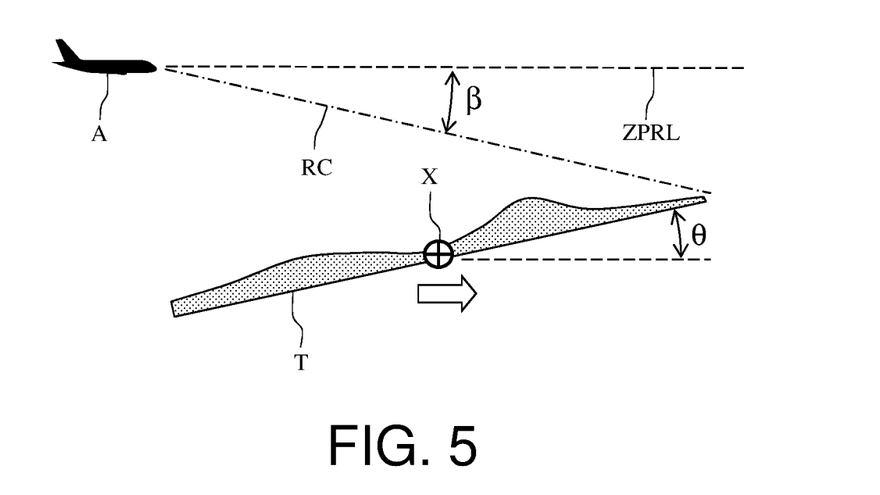
FIG. 5 represents a first variant of the preceding method in which the axial tilt is off-centred.

In FIG. 4, the axis X is situated vertically with respect to the device. It may, as shown in FIG. 5, be positioned in front of the aircraft, at a second distance of between a few nautical miles and 20 nautical miles. In this case, the terrain located below the aircraft is shown at an altitude that is greater than its real altitude.

Figure 6:
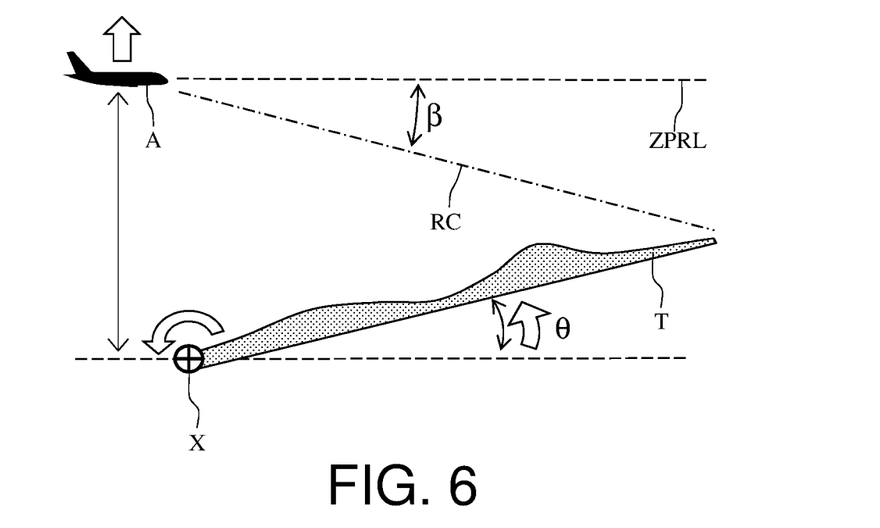
FIG. 6 represents the variation in tilt of the axis depending on the altitude of the aircraft.

Above a certain altitude of the aircraft, the tilt angle may increase with altitude H as shown in FIG. 6.

Figure 7:
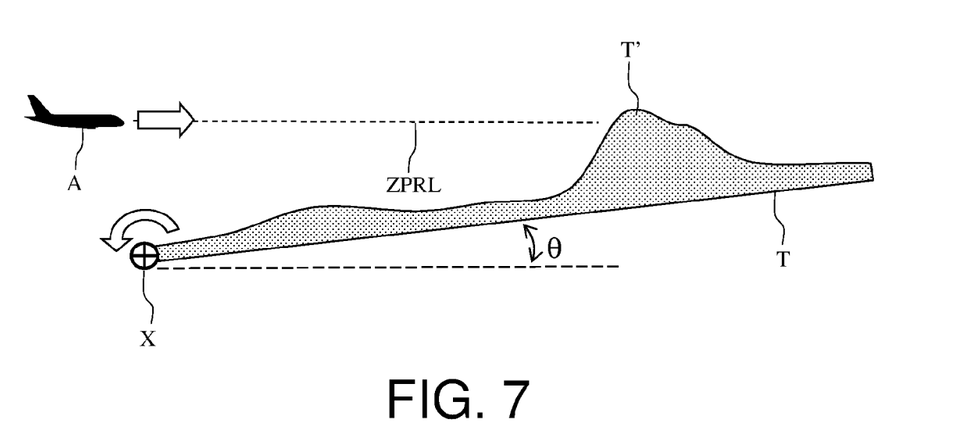
FIGS. 7 and 8 represent the dynamic behaviour of the graphical representation according to the invention.
Figure 8:
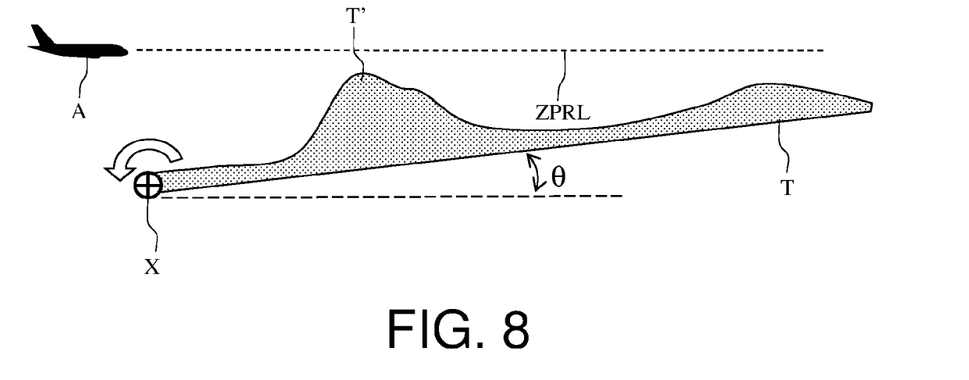

The method according to the invention leads to altitude errors on the terrain displayed in the background, i.e. the terrain may be shown as being above the carrier while in reality it is not, as shown in FIG. 7 in which the terrain T' is above the ZPRL. This situation has no significant consequences insofar as certain standards specify that the terrain located above the altitude of the carrier at a given instant in time must appear above the ZPRL. The method according to the invention simply makes the terrain appear above the ZPRL more often than it does in reality. This is therefore a more prudent solution than that of the prior art, and this helps to correct the feeling that the SVS visualisation is sometimes not sufficiently alarming. Lastly, as shown in FIG. 8, this situation does not persist. By principle, on approaching the obstacle, the obstacle gradually assumes its exact altitude.

In the case described above, the positioning error depending on the altitude may lead to substantial angular errors, of greater than one degree over high altitude terrains. The solution is then to base the tilt of the axis with respect to the lowest altitude of the terrain of the surrounding scene. This implies that the graphics engine is capable of determining the minimum and maximum altitudes of the surrounding scene, which does not pose any particular technical problems. Temporal and/or spatial filters must then be put in place in order to manage abrupt variations in the minimum altitude of the surrounding scene. This solution decreases the incidences of errors in displaying the background terrain.

In this case, the tilt angle not only depends on the altitude of the aircraft, but also on the difference in altitude between the position of the aircraft and the overflown terrain. Thus below are determined difference in altitude between the aircraft and the overflown terrain, the tilt angle may be zero. The value of this distance may be, for example, 7500 feet.

Figure 9:
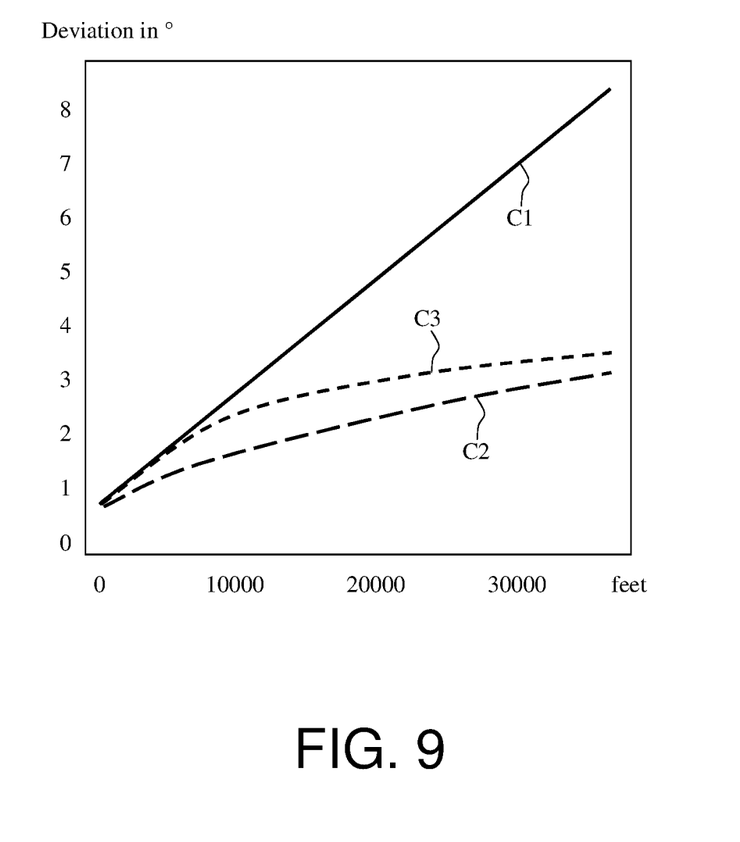
FIG. 9 represents, as a function of altitude, angular deviations between the ZPRL and the true horizon line and between the ZPRL and the limit of the cartographic representation before and after correction by the method according to the invention.

By way of example, the three curves of FIG. 9 denoted by C1, C2 et C3 represent, as a function of altitude:

C1: the angular deviations between the ZPRL and the limit of the cartographic representation without corrections;

C2: the angular deviations between the ZPRL and the true horizon;

C3: the angular deviations between the ZPRL and the limit of the cartographic representation after corrections.

The altitude varies from 0 to 30,000 feet and the angular deviation before corrections may reach 8° at high altitude, while it is limited to around 3° after corrections. Furthermore, the limit of the cartographic representation after corrections is very close to the true horizon, which is one of the main objectives sought.

Figure 10:
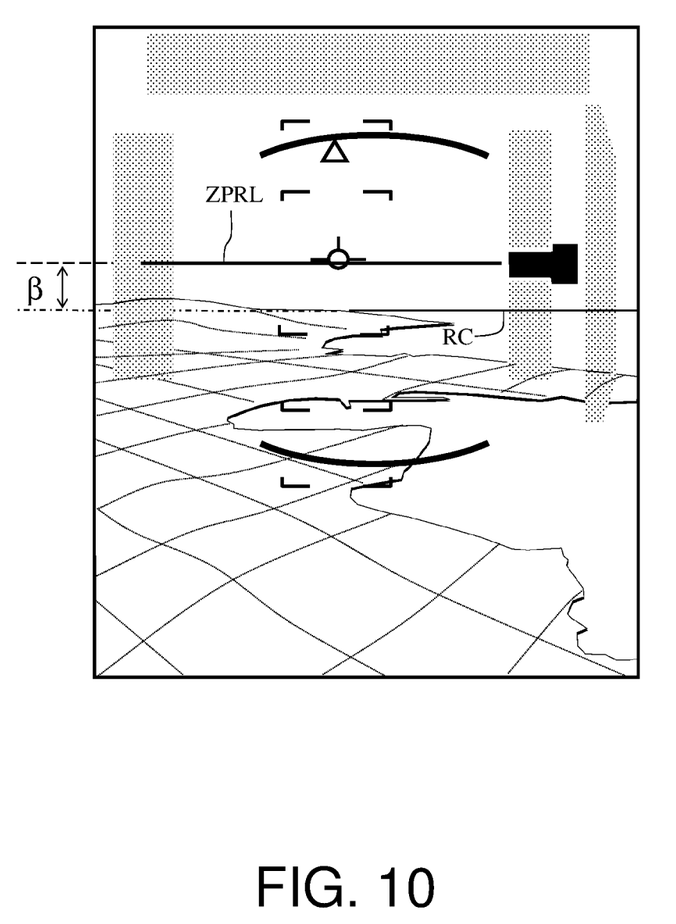
FIG. 10 represents the display, on an aircraft visualisation device, of a cartographic representation of the overflown terrain comprising a piloting symbology according to the invention.

By way of example, FIG. 10 shows the display of a cartographic representation of the overflown terrain on an aircraft visualisation device according to the method according to the invention comprising a piloting symbology. It is observed that the angular deviation between the ZPRL and the limit of the cartographic representation has notably decreased with respect to that of FIG. 2 which shows the same scene. The limit of the cartographic representation is now merged with the true horizon line.

What is claimed is:

1. A method for graphically representing a synthetic three-dimensional view of the exterior landscape in an on-board visualisation system for aircraft, said graphical representation being displayed on a visualisation screen comprising the piloting or navigation information of said aircraft superposed onto said three-dimensional synthetic representation of the exterior landscape, said synthetic representation being computed up to a first determined distance, wherein said three-dimensional synthetic representation is tilted at a tilt angle about an axis positioned at the level of the terrain in a substantially horizontal plane, and substantially perpendicularly to an axis between the flight direction and the heading of the aircraft, said axis moving with the aircraft, said tilt angle being computed so that the angle between the horizon line or ZPRL and the limit of the synthetic representation computed up to a first determined distance is limited to three degrees.

2. The graphical representation method according to claim 1, wherein the axis is positioned substantially vertically with respect to the aircraft.

3. The graphical representation method according to claim 1, wherein the axis is positioned in front of the aircraft, at a second distance of between a few tens of nautical miles and 40 nautical miles.

4. The graphical representation method according to claim 1, wherein below a determined difference in altitude between the aircraft and the overflown terrain, the tilt angle is zero.

5. The graphical representation method according to claim 4, wherein the value of the determined difference in altitude between the aircraft and the overflown terrain is 7500 feet.

6. The graphical representation method according to claim 1, wherein above a determined difference in altitude between the aircraft and the overflown terrain, the tilt angle increases with altitude.

7. The graphical representation method according to claim 1, wherein the tilt angle is determined so that the angular difference between the limit of the three-dimensional representation of the exterior landscape computed up to the first determined distance and a line representing the true horizon is less than one degree.

8. The graphical representation method according to claim 1, wherein the visualisation device comprises a real image of the exterior landscape superposed onto the synthetic view of the exterior landscape.

9. The graphical representation method according to claim 1, wherein the visualisation device is one of the screens of the instrument panel of the aircraft.

10. The graphical representation method according to claim 1, wherein the visualisation device is a visualisation device referred to as a "heads-up" visualisation device comprising an optical element superposing the synthetic image or the real image onto the exterior landscape.

* * * * *